United States Patent
Hankins

(10) Patent No.: US 6,971,715 B2
(45) Date of Patent: Dec. 6, 2005

(54) MOTORCYCLE SEAT SADDLE

(76) Inventor: Randel W. Hankins, 7700 St., Rte. 19, Mt. Gilead, OH (US) 43338

(*) Notice: Subject to any disclaimer, the term of this patent is extended or adjusted under 35 U.S.C. 154(b) by 0 days.

(21) Appl. No.: 10/767,995

(22) Filed: Feb. 2, 2004

(65) Prior Publication Data
US 2005/0179287 A1 Aug. 18, 2005

(51) Int. Cl.$^7$ .............................................. A47C 31/00
(52) U.S. Cl. ........................... 297/219.11; 297/195.13; 297/195.1; 297/250.1; 297/252; 297/452.23; 280/304.4
(58) Field of Search ....................... 297/219.11, 195.13, 297/195.12, 195.1, 250.1, 252, 452.23; 280/304.4, 280/290; 5/630, 632, 640, 655.3

(56) References Cited

U.S. PATENT DOCUMENTS

| | | | |
|---|---|---|---|
| 471,417 A * | 3/1892 | Bunker ..................... 297/195.1 |
| 2,562,725 A * | 7/1951 | Armetia et al. ................ 5/631 |
| 2,765,480 A * | 10/1956 | Mueller ........................ 5/640 |
| 2,952,856 A * | 9/1960 | Ruff ............................. 5/640 |
| 3,712,670 A | 1/1973 | Svehla | |
| 4,909,522 A | 3/1990 | Flannigan | |
| 5,322,345 A | 6/1994 | Desser | |
| D370,956 S * | 6/1996 | Pery .......................... D21/809 |
| 5,530,974 A * | 7/1996 | Rains et al. ................ 5/81.1 T |
| 5,697,671 A | 12/1997 | Shavitz | |
| D389,359 S * | 1/1998 | Nowak ........................ D6/601 |
| D412,867 S | 8/1999 | White | |
| D458,503 S * | 6/2002 | Norman ....................... D6/611 |
| 6,481,792 B1 | 11/2002 | Goin | |
| 6,640,366 B1 * | 11/2003 | Draves .......................... 5/630 |
| 6,648,408 B1 | 11/2003 | Grove | |
| D485,724 S * | 1/2004 | Morikawa ..................... D6/601 |
| D494,128 S * | 8/2004 | Berger ........................ D12/416 |

* cited by examiner

Primary Examiner—Laurie K. Cranmer
(74) Attorney, Agent, or Firm—Richard C. Litman

(57) ABSTRACT

The motorcycle seat saddle is a motorcycle passenger seat extension device designed to widen the seat to increase the passenger's comfort and sense of security while riding and ultimately enable longer rides. The seat saddle has two covered, cylindrical pads attached to the ends of a sturdy but flexible, rectangular panel member. In use, the panel rests on top of the motorcycle passenger seat with the cylindrical pads on either side, comfortably expanding the total surface area of the top of the seat. When the passenger mounts the seat saddle, the passenger's weight presses the cylindrical pads both downward and inward, securing the saddle to the seat. When not in use, the seat saddle can be easily removed and the two cylindrical pads rolled inwards together beneath the flexible rectangular member to render the seat saddle more compact for storage purposes.

8 Claims, 3 Drawing Sheets

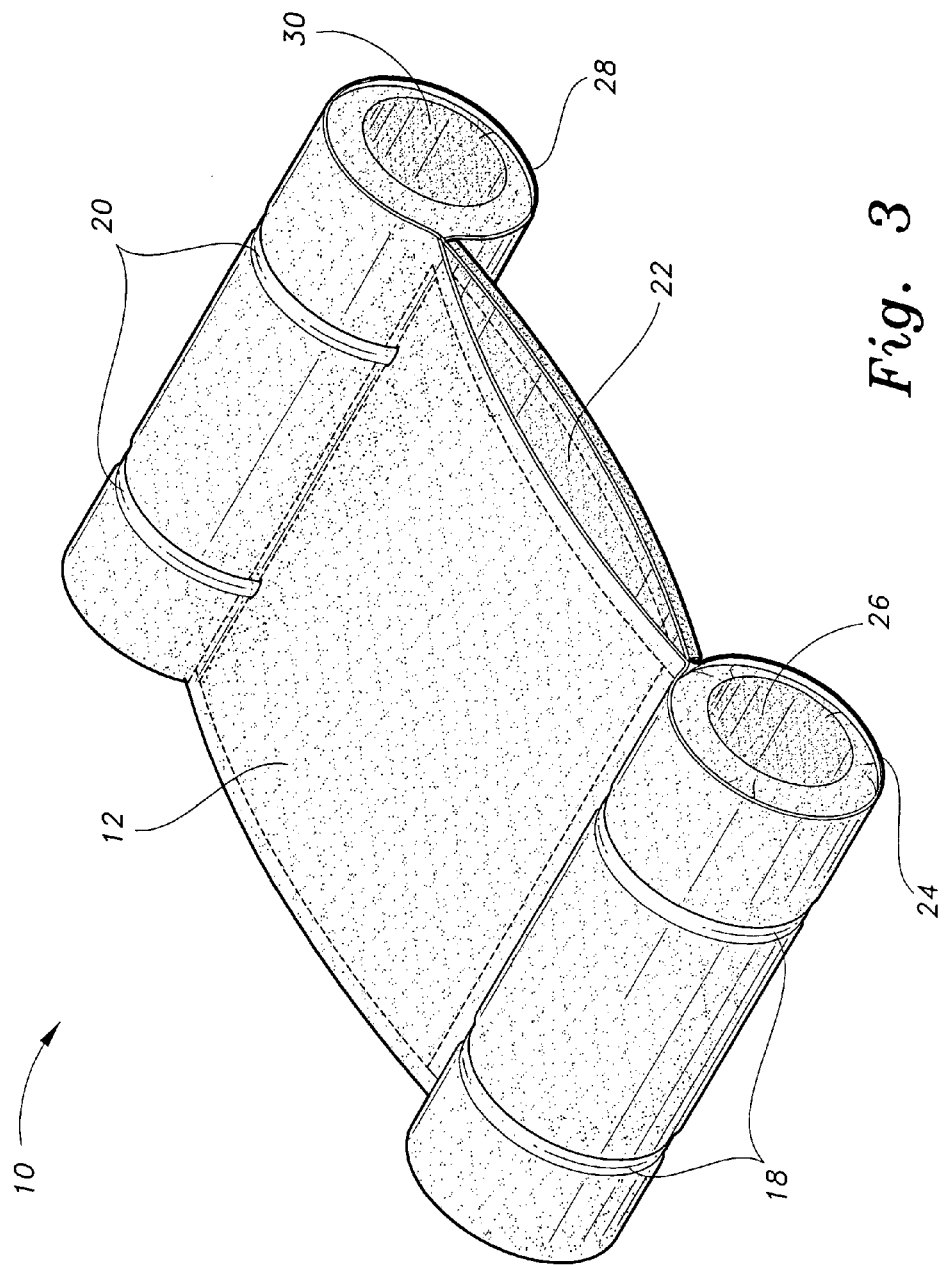

MOTORCYCLE SEAT SADDLE

BACKGROUND OF THE INVENTION

1. Field of the Invention

The present invention relates to motorcycle accessory devices, and particularly to a motorcycle seat saddle attachable to the passenger portion of a motorcycle seat designed to increase the comfort of a passenger on a motorcycle.

2. Description of the Related Art

The passenger seat of a motorcycle is often narrow, designed to compliment the sleek look of the motorcycle. This form over function approach increases the aesthetic value of the motorcycle for the rider but has notable negative consequences for the passenger. The thin seat concentrates the weight of the passenger into an uncomfortably narrow area. Riding for long distances is difficult without frequent stops for stretching and shifting due to the soreness caused by the painful pressure and position of the seat.

In addition, a narrow seat decreases the perceived sense of security for first time or beginner motorcycle passengers. The initial fear of riding on the back of a motorcycle in the open air instead of within the security provided by the metal frame of an automobile can be difficult to overcome by itself. Having less seat space than usual can cause the passenger to feel even less secure and attempt to compensate by clutching closer to the rider and overcrowding him or her. Worse, the discomfort and insecurity may cause passengers to move their bodies and shift their weight at the wrong moment during a ride, increasing the chance of an accident.

There is a need for a device to broaden the width of the passenger seat without increasing the height, as increasing the height could increase mounting and dismounting difficulty and decrease stability. Ideally, such a device would be effortlessly installed, removed and stored so that the rider may maintain the sleek look when riding alone, but can quickly and easily provide comfort for a passenger when needed for riding together.

U.S. Design Pat. No. 412,867, issued Aug. 17, 1999 to J. White, illustrates an ornamental design for a motorcycle passenger seat expander. The expander has a flat board or sheet of material with two rectangular, box-shaped elements depending from opposing ends of the board, which is positioned over a motorcycle passenger seat with the box-shaped elements on opposing sides of the seat.

U.S. Pat. No. 3,712,670, issued Jan. 23, 1973 to P. W. Svehla, discloses an accessory cup-shaped motorcycle seat attachment designed to conform to the shape of the buttocks of the human body. The accessory seat includes a cushion and has slots to receive hooks that attach the accessory seat to the motorcycle seat.

U.S. Pat. No. 5,697,671, issued Dec. 16, 1997 to A. D. Shavitz, describes a motorcycle seat enlarger designed to be attached to a passenger seat of a motorcycle. The enlarger includes front, top and side supports and is shaped to closely fit the seat of a motorcycle passenger seat. Belts and clips are used to secure the enlarger to the motorcycle seat.

U.S. Pat. No. 6,481,792, issued Nov. 1, 2002 to B. G. Goin, discloses a seat cushion designed to be placed on the passenger seat of a motorcycle. The seat cushion is designed to be separable into three sections for storage purposes. Adjustable stop members are used to secure the seat cushion to the motorcycle passenger seat.

Other patents showing motorcycle or bicycle seat attachments include U.S. Pat. No. 4,909,522, issued Mar. 20, 1990 to R. L. Flanigan (bicycle seat support attachment); U.S. Pat. No. 5,322,345 issued Jun. 21, 1994 to A. W. Desser (removable motorcycle fender seat attachment); and U.S. Pat. No. 6,648,408 issued Nov. 18, 2003 to J. E. Grove (second seat assemble for motorcycle fender).

None of the above inventions and patents, taken either singly or in combination, is seen to describe the instant invention as claimed. Thus, a motorcycle seat saddle solving the aforementioned problems is desired.

SUMMARY OF THE INVENTION

The motorcycle seat saddle of the present invention is a motorcycle passenger seat extension device designed to widen the seat to increase the passenger's comfort and sense of security while riding and ultimately enable longer rides. The seat saddle uses two covered, cylindrical pads attached to the ends of a sturdy but flexible, rectangular panel member. In use, the panel rests on top of the motorcycle passenger seat with the cylindrical pads on either side, comfortably expanding the total surface area of the top of the seat. When the passenger mounts the seat saddle, the passenger's weight presses the cylindrical pads both downward and inward, securing the saddle to the seat. When not in use, the seat saddle can be easily removed and the two cylindrical pads rolled inwards together beneath the flexible rectangular member to render the seat saddle more compact for storage purposes.

The seat saddle may also include a pocket beneath the rectangular member for storing maps or registration papers, and the foam cylinders may include a storage cavity defined therein to provide additional storage space for water bottles, bandanas or gloves.

BRIEF DESCRIPTION OF THE DRAWINGS

FIG. 3 is a perspective view of a second embodiment of a motorcycle seat saddle according to the present invention, including a pocket and cylindrical storage spaces.

Similar reference characters denote corresponding features consistently throughout the attached drawings.

DETAILED DESCRIPTION OF THE PREFERRED EMBODIMENTS

Figure 1:
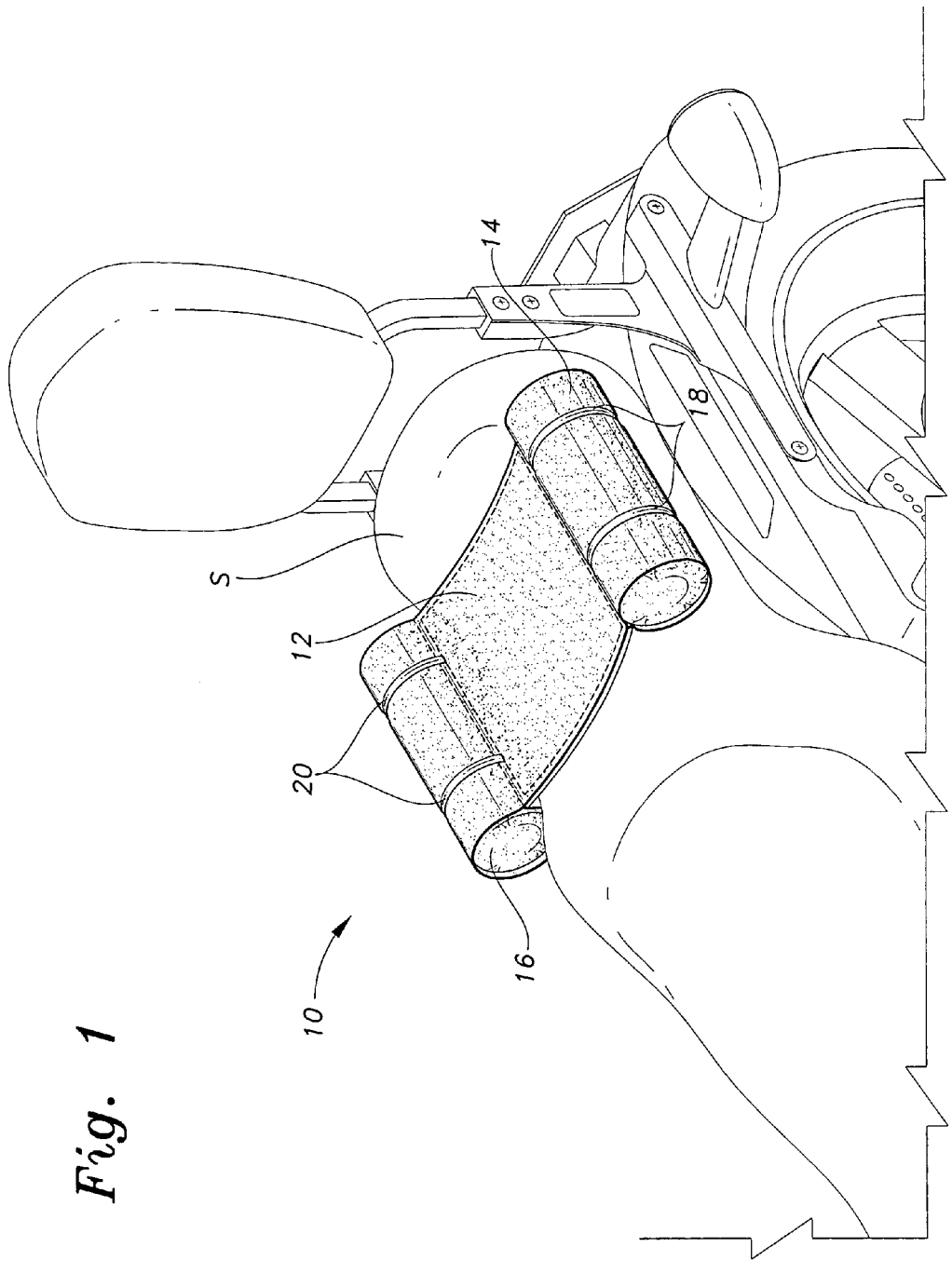
FIG. 1 is an environmental, perspective view of a motorcycle seat saddle according to the present invention.

The present invention is a motorcycle seat saddle, designated generally as 10 in the drawings. The seat saddle 10 is designed to rest on top of the passenger seat of a motorcycle and provide a greater surface area for seating, thereby increasing the comfort level and sense of security of the passenger.

Referring first to FIG. 1, the motorcycle seat saddle 10 includes a thin, flexible, rectangular panel member 12, having a top surface upon which the passenger sits and a bottom surface that remains in contact with the motorcycle passenger seat surface. The panel 12 may be constructed using any of various flexible, sturdy materials including, but not limited to, leather, vinyl, or fabric. The top of the panel 12 may be customized or decorated with emblems, slogans, colors, or designs as desired. The size of the panel 12 may be customized as well to properly cover the differently sized passenger seats of various motorcycles, but should preferably be approximately eight inches wide and seven inches long. As shown in FIG. 3, the panel 12 may optionally include a pocket flap 22 at one end of the panel 12 for storing maps, registration papers, etc.

Referring back to FIG. 1, two covered, cylindrical pads, 14 and 16 are attached lengthwise to either side of the panel 12. The covers for pads 14 and 16 are preferably constructed of the same material as the panel 12. The preferred embodiment uses leather for both the panel 12 and the covers of pads 14 and 16. In use when the passenger sits on the saddle 10, the passenger's weight forces the pads 14 and 16 both downward and inward. The typical motorcycle seat cover is leather, thereby providing a strong leather-to-leather grip between the seat and the saddle 10, increasing the stability of the saddle 10.

The pads 14 and 16 are equal in length to panel 12 and may be constructed in custom sizes, but preferably should be approximately three to four inches in diameter. The inner padding material (not shown) is not critical and may be any conventionally used padding material including but not limited to foam, rubber, feathers, cotton or even inflatable air bladders.

FIG. 3 illustrates an additional optional feature. The cylindrical pads 14 and 16 may be replaced with hollow, padded cylinders 24 and 28. The hollow, padded cylinders 24 and 28 are constructed of a rigid material with a padded outer surface to maintain passenger comfort, but a hollow interior defining a storage cavity to allow the passenger to make use of the storage spaces 26 and 28 for carrying water bottles, bandanas, gloves, or other miscellaneous items.

Returning to FIG. 1, the cylindrical pads 14 and 16 are attached to the panel 12 by conventional means, such as, but limited to, stitching, stapling or adhesive means, preferably stitching. The attachment between the panel 12 and the cylindrical pads 14 and 16 should run the full length of the joint between the panel 12 and the cylindrical pads 14 and 16 to provide a secure connection that is able to withstand passenger weight, repeated mounting and dismounting, and repeated folding for storage.

To provide additional support, reinforcing strips 18 and 20 encircle the pads 14 and 16. The reinforcing strips 18 and 20 may be attached by conventional means, including, but not limited to, stitching, stapling or adhesives, preferably stitching. The reinforcing strips 18 and 20 should be narrow in width so they do not significantly interfere with the general comfortable feel of the increased surface area of the saddle 10.

Figure 2:
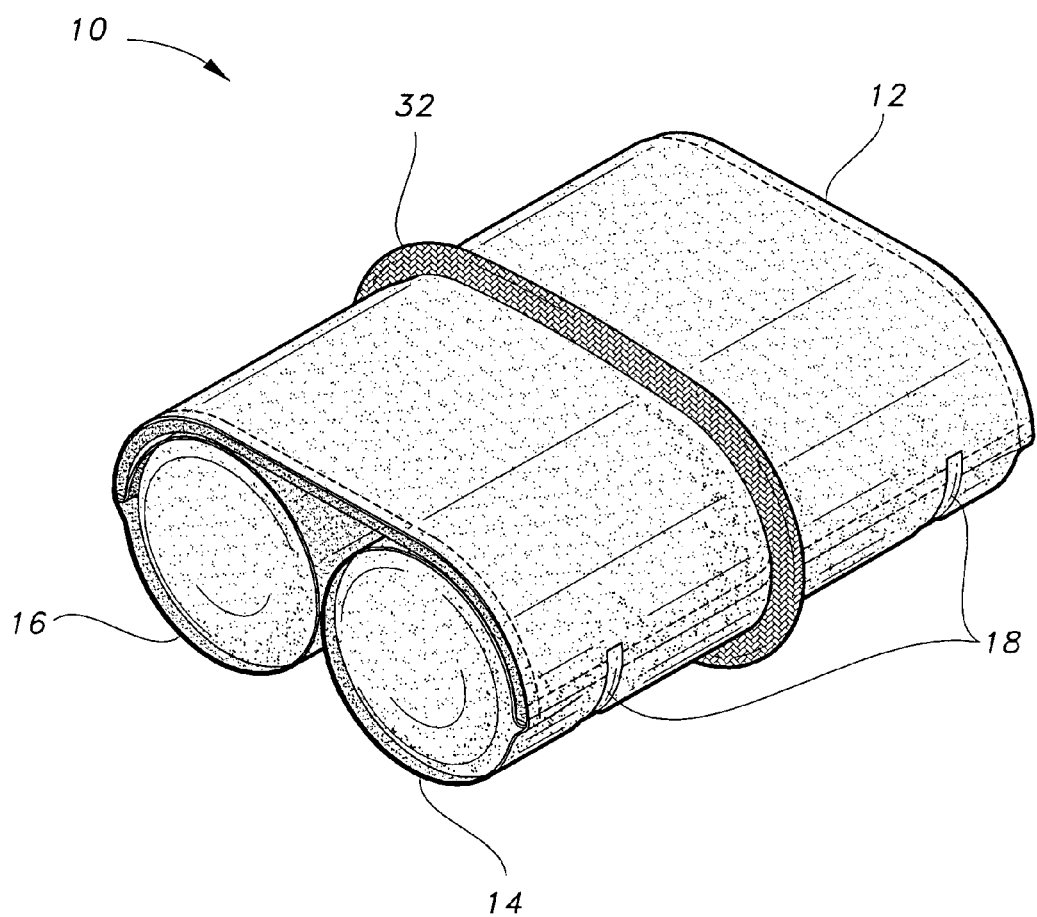
FIG. 2 is a perspective view of a motorcycle seat saddle according to the present invention in a closed position for storage purposes.

The motorcycle seat saddle 10 lifts right off the motorcycle seat S easily and may be folded for storage purposes. FIG. 2 illustrates the motorcycle seat saddle 10 removed and folded into its compact storage position. The two cylindrical pads 14 and 16 are drawn towards each other, meeting in the center of the bottom of the panel 12. The panel 12 partially wraps around the cylindrical pads 14 and 16. A bungee cord 32 may be used to secure the folded position. In this state, the motorcycle seat saddle 10 may easily be stored in a fork bag, which many bikers carry.

As an alternative to the bungee cord 32, a spring, curved rod or other biasing means may be stitched into the panel 12 to cause it to naturally return to its curled, compact storage position. The biasing means would provide the advantages of quicker storage when removed and additional side gripping when installed upon the seat.

It is to be understood that the present invention is not limited to the embodiments described above, but encompasses any and all embodiments within the scope of the following claims.

I claim:

1. A motorcycle seat saddle, comprising:
   (a) a flexible, rectangular panel having a top surface, a bottom surface, a front end, a rear end, and two opposing sides; and
   (b) first and second padded cylindrical pads attached to and extending along the opposing sides of the panel, the cylindrical pads depending below the panel, the panel being dimensioned and configured for extending across a passenger portion of a motorcycle seat with the first and second pads disposed on opposite sides of the seat in order to provide extended width to the passenger portion of the seat;
   wherein the rectangular panel includes a pocket at one of the ends for storing items such as maps or registration papers.

2. The motorcycle seat saddle according to claim 1, wherein the rectangular panel and cylindrical pad are made of fabric.

3. The motorcycle seat saddle according to claim 1, wherein the rectangular panel and cylindrical pad are made of leather.

4. The motorcycle seat saddle according to claim 1, wherein the rectangular panel and cylindrical pad are made of vinyl.

5. A motorcycle seat saddle, comprising:
   (a) a flexible, rectangular panel having a top surface, a bottom surface, a front end, a rear end, and two opposing sides; and
   (b) first and second padded cylindrical pads attached to and extending along the opposing sides of the panel, the cylindrical pads depending below the panel, the panel being dimensioned and configured for extending across a passenger portion of a motorcycle seat with the first and second pads disposed on opposite sides of the seat in order to provide extended width to the passenger portion of the seat;
   wherein the rectangular panel further includes means for biasing the panel to a naturally curled, C-shaped position, thereby drawing the two cylindrical pads together towards the center of the bottom of the panel when the motorcycle seat saddle is not in use.

6. The motorcycle seat saddle according to claim 1, wherein the cylindrical pads are foam pads.

7. The motorcycle seat saddle according to claim 1, wherein the cylindrical pads are rubber pads.

8. The motorcycle seat saddle according to claim 1, wherein the cylindrical pads have a storage cavity defined therein.

* * * * *